United States Patent Office 2,786,871
Patented Mar. 26, 1957

2,786,871

PROCESS FOR THE PREPARATION OF AMINO-METHYL-(MONOHYDROXYPHENYL)-KETONES

Ludwig Winterhalder, Konstanz, Boden See, Germany

No Drawing. Application March 16, 1955,
Serial No. 494,818

Claims priority, application Germany March 26, 1954

11 Claims. (Cl. 260—570.5)

The present invention relates to a process for preparing aminomethyl-monohydroxyphenyl-ketones having the general formula

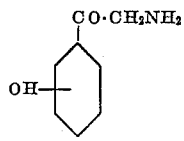

It is known that the halogen atom in halogen methyl-(dihydroxyphenyl)-ketones may be substituted by an amino group by treating the ketone with ammonia. For instance, if chloroaceto pyrocatechol is treated with ammonia, arterenone in about 50% yield is obtained. If, however, the same process is tried with halogen ketones which are substituted only by one hydroxyl-group in the phenyl radical, it is at best possible to obtain no more than minor amounts of the corresponding aminoketones. This is the more surprising as treatment with methylamine or methylbenzylamine results in the corresponding methylamino- or methylbenzyl-aminoketones (see, for instance, German Patent No. 518,636 and U. S. Patent No. 1,680,055), just as the ketone of the epinephrine is obtained when chloroaceto pyrocatechol is treated with methyl amine.

It has been unsuccessfully tried to treat chloroaceto pyrocatechol with hexamethylenetetramine and to treat the reaction product with an acid to obtain the ketoamine (arterenone), see Mannich, Hahn B. 44, 1548 and 1549. Mannich found that the treatment of this and similar halogen ketones with hexamethylenetetramine does not produce an addition compound but the splitting off of halogen acid, which made the process impossible. As Mannich also found, an addition compound of the halogen ketone and hexamethylenetetramine is formed when the two phenolic hydroxyl groups of the halogen acetopyrocatechol are closed, i. e. by acylation or etherification. In the latter case, the addition compound is obtained in good yield and after separation of the acyl or ether groups, arterenone may be obtained by hydrolysis. Mannich used the same method with a product having only one phenolic hydroxyl group by etherifying this group (Mannich, Hahn B. 44, 1547 and Mannich, Thiele Ar. 253, 193). By these processes the compound with the free hydroxy group is only to be obtained with great losses in the yield.

Surprisingly, it has now been found that halogen methyl - (monohydroxyphenyl) - ketones form addition compounds with hexamethylenetetramine even if the phenolic hydroxyl groups are not closed, without the formation of halogen acids. The addition compounds are formed practically in theoretical yield from chlorine, bromine and iodine ketones, regardless of the position of the hydroxyl-group in the benzene ring, and when the addition compound is split with the aid of an acid, for instance hydrochloric acid, the yield also is very good so that the halogen ketones may be converted into the corresponding ketoamines by this method in a yield of 80% and higher. Surprisingly, the yield is even higher than with the use of ketones whose phenolic hydroxyl-group has been esterified or etherified.

Unexpectedly, the monohydroxy and dihydroxy-compounds react quite differently in this process. This is the more surprising as the treatment of monohydroxyphenyl-halogenmethylketones with ammonia is not feasible, as explained hereinabove, in contrast to the dihydroxyphenyl derivatives which can be successfully treated in this manner. It was to be assumed, therefore, that the addition of hexamethylene-tetramine with open hydroxyl-groups would be even less feasible than in the case of the dihydroxy-compounds.

It has been found that the process is generally applicable to all halogenmethyl-(monohydroxyphenyl)-ketones wherein the halogen atom may be chlorine, bromine or iodine. It is of particular advantage with compounds where the hydroxyl-group is in the 2- or 4-position relative to the ketone group.

In accordance with the invention the hexamethylenetetramine addition compound is produced by adding the halogen ketone to about an equivalent molar amount of hexamethylenetetramine in a polar solvent or a mixture of solvents containing at least one polar constituent. For the reaction it is quite sufficient if the starting materials—halogen ketone and hexamethylenetetramine—are only partly soluble in the solvent or the mixture of solvents, i. e. it is sufficient, when only 2.5%, preferably 5%, based on the amount of one or of both starting materials is dissolved in the solvent. It is possible to use chloroform for the preparation, but also any other halogenated hydrocarbon, such as trichloroethylene, tetrachloromethane, perchloroethylene, dichloroethylene, dichloroethane, dichloropropane, isopropylbromide, butylene bromide, etc. As the p-monohydroxyphenyl-halogenmethyl ketones are rather difficultly soluble in these solvents, it is advisable when using these solvents to heat gently—at least at the beginning of the reaction— e. g. to a temperature between 30–50° C. Advantageously, however, ethyl alcohol or benzene are added whereby the solubility of the halogen ketone is increased. But it is not necessary to add so much of these solvents that at a temperature of 30–40° C. the total amount of the starting materials is in solution. As further solvents the following may be mentioned: aliphatic alcohols, such as methanol, ethanol, propanols, butanols, etc., acetone, methylethyl ketone, chlorobenzene, esters such as methyl acetate, ethyl acetate and mixtures of these solvents with each other or with benzene, toluene or the like. If the solubility of the halogen ketone or hexamethylenetetramine is not sufficient, it may be increased by the addition of methanol or of an amount of water not too large—preferably not more than 10% on the total solvent. Non-polar solvents such as benzene, toluene, cyclohexane, pentane, hexane etc. are not suitable for carrying out the reaction unless other better dissolving solvents are admixed. Heating during the reaction is not necessary but advisable. For speeding up the reaction an increasing of the temperature up to 30–40° C. or a bit more is advisable, especially in case of poorly dissolving solvents. It is not necessary to carry on the heating until the reaction is finished. When using dissolved starting materials after a short time (10–20 minutes) after the dissolved components have been contacted the solution becomes cloudy with precipitation of the addition compound. If mixtures of solvents are used in which the starting materials are only partly soluble, a little agitating—e. g. by stirring—is advisable. When contacting the not perfectly dissolved components, the suspension—especially under a slight heating—becomes gradually clearer and as a rule is absolutely clear for a short time before the addition compound precipitates. Generally the reaction is practically finished after 8–10 hours. In order to increase the yield the reaction mixture is advantageously allowed to stand a longer time e. g. 24–72 hours.

The separated addition compound is washed and can subsequently be immediately split in a known manner, i. e. by heating with a strong acid, especially an inorganic acid, most preferred acids being hydrochloric acid, sulfuric acid, hydrobromic acid, phosphoric acid, benzenesulfonic acid, toluenesulfonic acid, methanesulfonic acid, in an alcoholic or aqueous solution. Preferred alcohols are methanol, ethanol, propanols, butanols, glycols. The alcohol may be substituted partly or completely by water, but the use of an alcohol is preferred. When the preparation of the addition compound is carried out in an alcoholic solution, the separation of the addition compound will not be necessary and the decomposition may be effected by the direct addition of the strong acid to the alcoholic solution. The heating period is considerably shorter than with acylated halogenmethylhydroxyphenyl-ketones, which is advantageous for the purity of the resulting aminoketones.

The decomposition of the addition product is advantageously carried out by means of alcoholic hydrochloric acid or a mixture of an alcohol (methanol, ethanol or isopropyl alcohol) and concentrated hydrochloric acid, the amount of acid being somewhat in excess of the amount required to neutralize the resulting amino ketone and the ammonia. Instead of hydrochloric acid also other acids may be used such as sulfuric acid, hydrobromic acid, phosphoric acid, toluene sulfonic acid etc.

The process of this invention will be illustrated by the following examples:

*Example I*

34 g. p-hydroxy-ω-chloroacetophenone (melting point 147° C.) and 28 g. hexamethylenetetramine were dissolved at a slightly elevated temperature in a mixture of 400 ccm. of tetrachlorethane and 80 ccm. of alcohol, the alcohol being added to increase the solubility of the starting components. After about 10 minutes, the addition compound slowly began to crystallize out. The product was left standing for about 2 to 3 days at room temperature and then filtered off. The reaction product was obtained in a yield of about 58–60 g. It had a melting point of 185° C. (strong foaming in brown coloration) and was soluble in water.

The tetrachlorethane alcohol mixture may be recovered by distillation.

35 g. of the dry addition compound were mixed under agitation with a mixture of 260 ccm. alcohol and 47 ccm. concentrated hydrochloric acid for about 35 hours at room temperature (20° C.). After the alcohol was vacuum-distilled, the residue was dissolved in 150 ccm. of water and a sufficient amount of ammonia with a concentration of 25% was added to the solution to obtain a pH value of 8.0. Thereby 15 g. p-hydroxy-ω-aminoacetophenone precipitated, which is a yield of 88% of theoretical.

By the neutralization of the keto base by means of hydrochloric acid and evaporation of the water the hydrochloride of this base was obtained in a known manner. By means of other acids the corresponding salts of the keto base were obtained.

*Example II*

The procedure of Example I was repeated with the identical results, but using a mixture of 400 ccm. tetrachlorethane and 80 ccm. benzene instead of alcohol. The yield was the same as in Example I.

*Example III*

21.5 g. p-hydroxy-ω-bromacetophenone (melting point 151° C.) and 14 g. hexamethylenetetramine were dissolved in a mixture of 300 ccm. chloroform and 60 ccm. alcohol. After about 15 minutes, the addition compound began to crystallize out. The product was left standing for about 4 days and then filtered. The addition compound thus obtained melted at 174° C. under strong foaming in brown coloration (yield 34.2 g.).

9 g. of the addition compound were mixed under agitation for 2 days in a mixture of 80 ccm. alcohol and 12.5 ccm. concentrated hydrochloric acid. At the end of this mixing process, a perfect solution was obtained. After adding a sufficient amount of ammonia to give a pH value of 8.0–8.2, 3.1 g. of p-hydroxy-ω-aminoacetophenone, or 82% of theoretical, was precipitated.

*Example IV*

3 g. p-hydroxy-ω-iodoacetophenone (melting point 130° C.) and 1.6 g. of hexamethylenetetramine were dissolved in 40 ccm. tetrachlorethane at a temperature of 35° C. The crystallization began soon and was finished in a few hours. 4.4 g. of addition compound were obtained, the addition compound melting at a temperature of 173° C. under strong foaming. Hydrolysis of 4 g. of the addition compound in 35 ccm. alcohol and 5.5 ccm. concentrated hydrochloric acid yielded after treating with ammonia to a pH of 7.9 and conversion of the ketoamine into the chlorhydrate 1.9 g. of p-hydroxy-ω-aminoacetophenone hydrochloride (melting point 242° C.), or 88% of theoretical.

*Example V*

4 g. o-hydroxy-ω-chloracetophenone (melting point 73° C.) and 3.3 g. hexamethylenetetramine were dissolved in 60 ccm. trichlorethylene at a temperature of about 40° C. Crystallization began after a short period of standing (about 15 minutes) and was finished in 48 hours. 7.2 g. of the addition compound was obtained, the compound having a melting point of 151° C. under strong foaming. For hydrolysis 7.2 g. of the addition compound were agitated in a mixture of 52 ccm. alcohol and 9.4 ccm. concentrated hydrochloric acid, the hydrolysis resulting in about 30 minutes in a complete solution. After standing overnight, ammonium chloride crystallized and was filtered from the solution. The filtrate was treated with ammonia to a pH of 8 and yielded a base which with concentrated hydrochloric acid yielded in the hydrochloride of o-hydroxy-ω-aminoacetophenone (melting point 235° C. under decomposition). Yield: 3.1 g.

*Example VI*

1.4 g. of the o-hydroxy-ω-iodoacetophenone hexamethylenetetramine addition compound prepared according Example IV were agitated with a mixture of 20 ccm. water and 2 ccm. concentrated hydrochloric acid until a complete solution was obtained. The solution was treated with ammonia to a pH of about 7.5. The precipitated base (0.4 g.) was filtered off. The base was taken up by means of an equivalent amount of hydrochloric acid and the obtained watery solution evaporated to dryness. The dry residue was the hydrochloride of the base, which decomposed at a temperature of about 235° C.

*Example VII*

8.5 g. p-hydroxy-ω-chloro-acetophenone were dissolved in 30 ccm. of ethanol and 7.0 g. hexamethylenetetramine were dissolved in 70 ccm. ethanol under heating up to 40° C. and then mixed together. After some minutes the solution became cloudy increasing in cloudiness in the course of one hour until a strong crystallized precipitate separated. After standing overnight 10 g. of the condensation product had precipitated and were filtered off. After standing for 1–2 days further 2 grams were obtained from the mother liquor. The melting point was about 170–175° (strong foaming).

10 g. of the addition compound were added to a mixture of 35 ccm. methanol and 35 ccm. water to which 13.5 ccm. hydrochloric acid (10 n) had been added and allowed to stand at a temperature of about 40° for a period of 20 hours. After addition of sufficient ammonia with a concentration of 25% to give a pH of 8.0 4.2 g. of the nor-aminoketo base crystallized out. Melting point of the hydrochloride 243°.

Alternatively, the addition compound was decomposed by adding 15 ccm. hydrochloric acid (10 n) directly to the alcoholic suspension of the condensation product before filtration. After treating with ammonia, the yield was 7.1 g. of the nor-aminoketo base.

*Example VIII*

8.5 g. p-hydroxy-ω-chloroacetophenone were dissolved in 30 ccm. acetone and added at room temperature to a suspension of 7.0 g. hexamethylenetetramine in 60 ccm. aqueous acetone containing 20% water. After standing for 48 hours, 14.0 g. of the addition compound had crystallized having a melting point of about 175°.

The decomposition was carried out according to the preceding example.

*Example IX*

8.5 g. p-hydroxy-ω-chloroacetophenone were dissolved in 50 ccm. ethyl acetate and mixed with a solution of 7.0 g. hexamethylenetetramine in 50 ccm. sec. butyl alcohol containing 5% water. After standing for 2 hours 12.5 g. of the desired reaction product with a melting point of 175° were filtered off.

The decomposition was carried out according to Example VII.

*Example X*

8.5 g. p-hydroxy-ω-chloroacetophenone in 30 ccm. methylethyl ketone and 7 g. hexamethylenetetramine in 55 ccm. isopropyl alcohol containing 10% water were admixed at a temperature of 30° and allowed to stand at room temperature for 48 hours. 14 g. addition compound were obtained; melting point 175°.

The decomposition was carried out according to Example VII.

*Example XI*

8.5 g. o-hydroxy-ω-chloroacetophenone dissolved in 20 ccm. ethyl acetate were mixed with a solution of 7 g. hexamethylenetetramine in 50 ccm. sec. butyl alcohol containing 5% water. After standing for 40 hours 6.0 g. of the addition compound were separated. Melting point 182°.

The splitting was carried out according to Example VII.

*Example XII*

7 g. hexamethylenetetramine in 50 ccm. methanol containing 2% water and 8.5 g. o-hydroxy-ω-chloroacetophenone in 50 ccm. benzene were admixed. After standing for 24 hours, 5.5 g. of the addition compound had crystallized. Melting point 182°. The splitting was carried out according to Example VII. The hydrochloride of the base obtained as above had a melting point of 234° (decomposition).

*Example XIII*

10.8 g. m-hydroxy-ω-bromoacetophenone (melting point 92°) were mixed with 40 ccm. methylethyl ketone and were mixed with a solution of 7 g. hexamethylenetetramine in 50 ccm. isopropyl alcohol with a concentration of 90%. After a period of 24 hours the addition compound was filtered off. Yield 12.5; melting point 166° (foaming).

5 g. of this compound were mixed with a mixture of 30 ccm. alcohol, 4 ccm. concentrated H₂SO₄ and 5 ccm. H₂O and well agitated. After about one hour practically all the solids were dissolved and after standing for about 15 hours a great amount of new crystals had precipitated which were filtered off. These crystals were m-hydroxy-ω-aminoacetophenone-sulphate (5 g.) which was contaminated by ammonium sulphate. After standing for two days 1 further gram of the same impure product had crystallized out.

The combined crystals were dissolved in about 50 ccm. of water and made ammoniacal to a pH of 8.0 with ammonia whereby the base precipitated. The base was filtered off by suction, washed with a little water and dissolved in 20 ccm. of sulfuric acid with a concentration of 10%. The solution was evaporated to dryness and the residue being m-hydroxy-ω-aminoacetophenone sulfate was twice ground finely with about 5 ccm. alcohol each and filtered off respectively. After drying 2.4 g. of the sulfate were obtained with a decomposition point of about 200° C.

*Example XIV*

21.5 g. p-hydroxy-ω-bromoacetophenone were dissolved in 80 ccm. acetone and mixed with 14 g. hexamethylenetetramine in 10 ccm. H₂O and 90 ccm. butanol. After about 10 minutes the crystallization of the addition compound began and had nearly come to an end after standing for a period of about 15 hours. For complete crystallization it was advisable to allow standing for 48 hours. Yield 28 g. (melting point 174°).

8 g. of the substance were well agitated for some time with a mixture of 60 ccm. methanol, 10 ccm. H₂O and 8 ccm. concentrated H₂SO₄. Dissolution took place during the course of 2 hours and while standing over night a crystallized product was formed, which was sucked off. Yield 9 g., melting point 165° (partial decomposition).

5 g. of this crude sulfate were dissolved in 20 ccm. H₂O and treated with ammonia to a pH of 8.0, thereby precipitating the base. The base was filtered off, washed with H₂O and then converted with hydrochloric acid into the p - hydroxy - ω - aminoacetophenone hydrochloride. Melting point 243° (decomposition).

*Example XV*

3 g. p-hydroxy-ω-iodoacetophenone with a melting point of 130° were dissolved in 30 ccm. isopropyl alcohol and combined with 1.6 g. hexamethylenetetramine dissolved in 15 ccm. acetone containing 20% H₂O. After a period of few hours the crystallization was completed; yield 4.4 g., melting point 173° (with strong foaming).

By the splitting of 4.0 g. of the above product in 35 ccm. propyl alcohol and 5.5 ccm. concentrated HCl 1.9 g. p-hydroxy-ω-aminoacetophenone hydrochloride with a melting point of 243° (88% of the theoretical) were obtained.

*Example XVI*

3.0 g. o-hydroxy-ω-iodoacetophenone with a melting point of 65° and 1.8 g. hexamethylenetetramine were dissolved in 40 ccm. perchloroethylene under heating to 40° C. After a period of few hours the crystallization of the addition product was finished and the whole contents of the flask had become solid. Yield 4.5 g., melting point 145° (foaming). The product was difficultly soluble in alcohol and water.

For the purpose of splitting 3.0 g. of the above compound were agitated with a mixture of 30 ccm. alcohol and 4.1 ccm. concentrated HCl, during the course of 3–4 hours all of the compounds had dissolved and NH₄Cl and some NH₄J were precipitated which were sucked off. The filtrate was evaporated to dryness, the residue was dissolved in 20 ccm. alcohol and then 4 ccm. of ether were added, some ammonium chloride and ammonium iodide being precipitated, which were filtered off. By the addition of more ether the hydrocholoride of o-hydroxy-ω-aminoacetophenone was precipitated from the filtrate. Melting point 235°. Yield 1.1 g.=78% of theoretical.

*Example XVII*

8 g. of the addition compound of p-hydroxy-ω-chloroacetophenone and hexamethylenetetramine were agitated with 60 ccm. alcohol and 24 ccm. hydrobromic acid. After a period of some hours the pricipitated NH₄Br and NH₄Cl were filtered off and then the filtrate was evaporated. By means of dissolving the residue in water, precipitating the solution with NH₃ and converting the base into the known p-hydroxy-ω-aminoacetophenone hydrochloride with a melting point of 243° as in Example VII, the reaction product may be clearly characterized. Yield 4.2 g.=82% of theoretical.

While the process of the invention has been described and illustrated in conjunction with certain specific examples various changes and modifications may occur to the skilled in the art who benefit from this teaching without departing from the scope and spirit of the present invention as defined in the appended claims.

What is claimed is:

1. A process for preparing aminomethyl-(monhydroxyphenyl)-ketones having the general formula

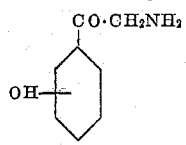

comprising the steps of reacting a halogenmethyl-(monohydroxyphenyl)-ketone wherein the halogen is selected from the group consisting of chlorine, bromine and iodine with a substantially equi-molecular amount of hexamethylenetetramine in the presence of a solvent adapted to dissolve at least 2.5% of the amount of at least one of the reaction components, said solvent being selected from the group consisting of polar solvents and solvent mixtures containing at least one polar constituent, and decomposing the resultant addition compound with a strong acid to obtain the corresponding ketoamine.

2. The process of claim 1, wherein said solvent is a halogenated hydrocarbon.

3. The process of claim 2, wherein ethyl alcohol is admixed with said halogenated hydrocarbon solvent.

4. The process of claim 2, wherein benzene is admixed with said halogenated hydrocarbon solvent.

5. The process of claim 1, wherein said solvent is an alcohol.

6. The process of claim 1, wherein the reaction is initiated at a temperature between about 30°–50° C.

7. The process of claim 6, wherein a major portion of the reaction is carried out at a temperature between about 30°–40° C.

8. The process of claim 1, wherein the addition compound is heated with a strong acid to effect the decomposition.

9. The process of claim 1, wherein said strong acid is selected from the group consisting of hydrochloric acid, sulfuric acid, hydrobromic acid, phosphoric acid, benzenesulfonic acid, toluenesulfonic acid, and methanesulfonic acid.

10. The process of claim 1, wherein the decomposition of the addition compound with a strong acid is carried out in the presence of an alcohol selected from the group consisting of methanol, ethanol, propanols, butanols, and glycols.

11. The process of claim 10, wherein up to 10% of water is admixed with the alcohol.

References Cited in the file of this patent

UNITED STATES PATENTS

| | | |
|---|---|---|
| 2,515,239 | Long | July 18, 1950 |
| 2,546,762 | Long | Mar. 27, 1951 |
| 2,680,134 | Gregory | June 1, 1954 |
| 2,721,207 | Bambas | Oct. 18, 1955 |

FOREIGN PATENTS

| | | |
|---|---|---|
| 74,484 | Denmark | July 28, 1952 |

OTHER REFERENCES

Bost et al.: JACS 73; 5864–5865 (1951).
Cutter et al.: JACS 74; 5475–5481 (1952).
Suter et al.: JACS 75; 4330–4333 (1953).
Delepine: Compt. rend. 120, 501 et seq. (1895).
Sommelet: Compt. rend. 157, 852–4 (1914).
Galat et al.: JACS 61; 3585–3586 (1939).
Angyal et al.: J. Chem. Soc. 1949, 2700–2706; Nature 161, 723 et seq. (1948).